Figure 2:
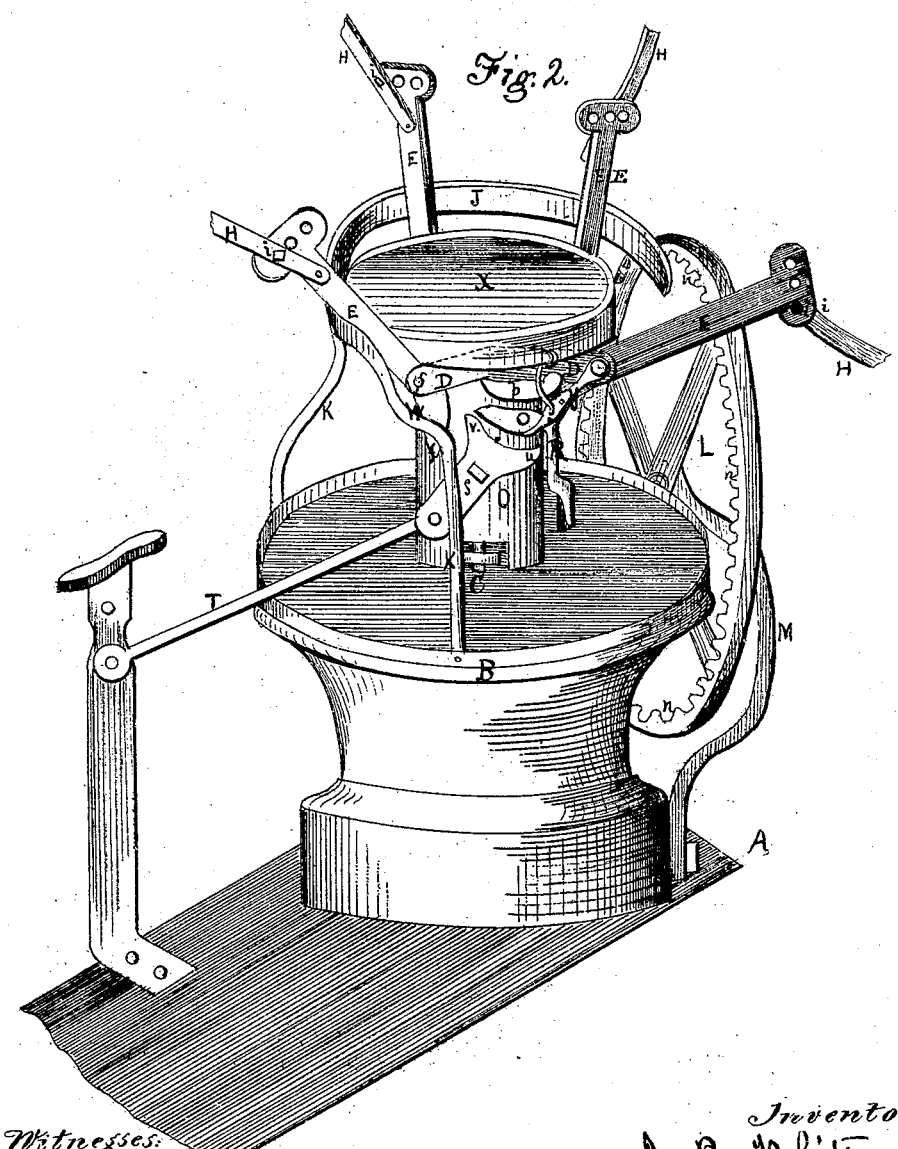

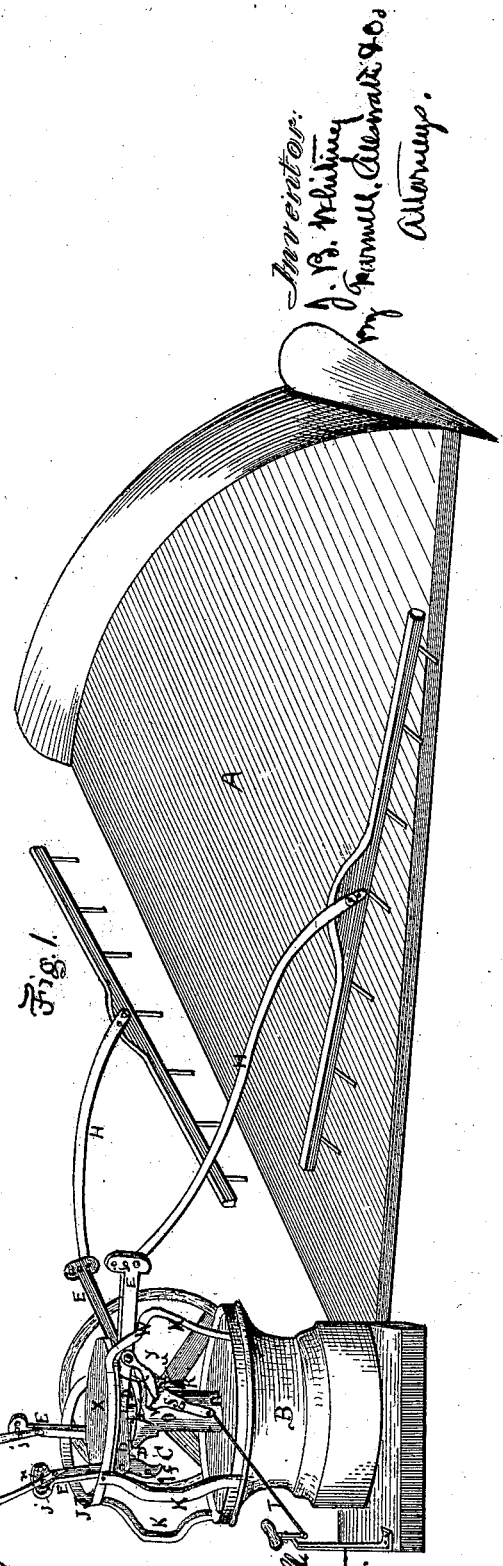
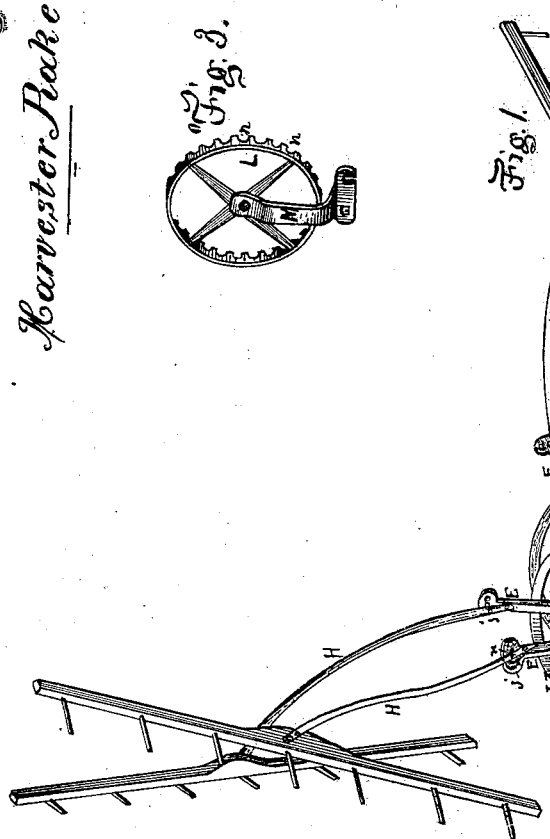
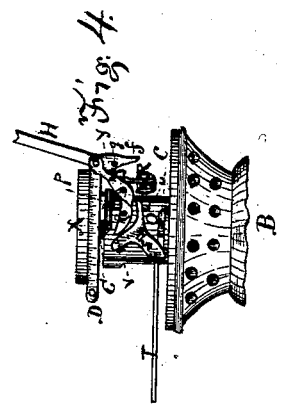
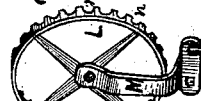

J. B. WHITING.
Improvement in Combined Rakes and Reels for Harvesters.

No. 115,004. 2 Sheets--Sheet 2. Patented May 16, 1871.

UNITED STATES PATENT OFFICE.

JOHN B. WHITING, OF RIPON, WISCONSIN.

IMPROVEMENT IN COMBINED RAKE AND REEL FOR HARVESTERS.

Specification forming part of Letters Patent No. 115,004, dated May 16, 1871; antedated May 12, 1871.

*To all whom it may concern:*

Be it known that I, JOHN B. WHITING, of Ripon, in the county of Fond du Lac and State of Wisconsin, have invented a new and useful Combined Rake and Reel for Harvesters; and I do hereby declare the following to be a full, clear, and exact description thereof, which will enable others skilled in the art to which my invention appertains to make and use the same, reference being had to the accompanying drawing, forming part of this specification.

Figure 1, Sheet 1, is a perspective view of a harvester, showing my improvements applied thereto. Fig. 2, Sheet 2, is a perspective view of the mechanism for operating the reels and rakes, mounted upon a section of the harvester. Fig. 3, Sheet 1, is a detached view of the wheel for lifting the rake and reel from the platform. Fig. 4, Sheet 1, is a detached view of the weighted cam, to be hereinafter referred to.

Similar letters of reference indicate corresponding parts in the several figures of the drawing.

My invention has for its object to improve the construction and operation of that class of harvester-rakes which revolve with the reels to sweep over the platform of the machine, as will be hereinafter described.

In the accompanying drawing, A is the platform of a harvester, of the usual construction. At the inner angle of the platform, on a line, or nearly so, with the cutter-bar, is mounted a standard, B, which sustains the reel and rakes and their operating mechanism.

C is a shaft, extending vertically through the center of the standard B, and provided upon its upper end with the radial arms D, to which the shanks E of the rake and reel arms are pivoted. These shanks are each provided at their inner ends with a toe, *f*, through which a transverse pin, *g*, passes to bear against the under side of the radial arms D, for the purpose of holding the shanks in a horizontal position while the rake and reel pass over the platform.

To the outer ends of the shanks the arms H of the rake and reel are pivoted, being adjusted higher or lower, with relation to the platform of the harvester, by means of the pins *i* and the series of perforations in the ends of the shanks.

J is a semicircular or curved guide for the shank of the rake and reel arms, supported in a horizontal position upon the standard B by means of the braces K, and extending slightly above the vertical shaft C. It is arranged upon the outer side of the standard to leave the space next the platform unobstructed for the vertical movement of the rake and reel arms.

L is a wheel for lifting the reel and rake arms after their passage over the platform of the harvester. It is mounted for vertical rotation upon an upright, M, affixed to the rear of the standard B, as shown in Fig. 2. The flange or rim of this wheel revolves slightly above or over the rear end of the guide-frame J, and is provided with a series of curved notches, *n*, which receive and lift the rake-arms from the platform, as will be presently described.

The lower end of the upright M, which carries the wheel, is extended upon each side and bolted to the standard B. The outer bolt-hole is cut out to form a vertical slot, as shown in Fig. 3, to permit the adjustment of the wheel nearer to or farther from the platform of the machine for a longer or shorter stroke of the reel and rakes.

O is a curved plate mounted upon the standard B, around that side of the vertical shaft C next the cutter-bar of the machine. The upper end of this plate, beneath the radial arms of the shaft C, is provided with a horizontal flange, *p*, against which the toes of the rake-arm shanks bear in their passage over the platform.

R is a weighted cam, pivoted at or near its center to the face of the curved plate O, with its upper edge slightly below the flange *p*. S is the cam-shipper, also pivoted to the face of the curved plate, and connected at its lower end by a rod, T, to a foot-lever mounted upon the frame of the harvester in front of the standard B. The arm *u* of this shipper extends under the cam R, beyond the pivot of the latter, toward its weighted end. When the shipper is operated by the foot-lever in the direction of the arrow, Fig. 2, the arm *u* lifts and holds the weighted cam with its upper edge parallel to the flange $p$ upon the curved plate. The shorter arm $v$ of the shipper, when the latter is moved in the opposite direction, holds the weighted cam in an inclined position, with its shorter end against the flange $p$, as shown in Fig. 4. The weighted cam assumes an inclined position when not operated by the shipper.

When it is desired operate the reels with one only acting as a rake, the cam-shipper is left free, and the shaft C rotated, by any suitable means, from the driving-wheel of the machine. When the reel-arms reach the forward end of the guide-track J they are dropped down to throw the reels in front of the standing grain by the shoulder or incline W at the front end of the track. The cam is thrown into an inclined position under the influence of its weight, and as the reels continue to revolve the toes $f$ of the shanks E strike the cam, as shown in Fig. 4, and are guided downward to throw up the reel-arms at the proper moment for clearing the grain. As the reel-arms finish their sweep across the platform the toes $f$ clear the cam, and the shanks E drop within one of the notches of the lifting-wheel. The continued motion of the shanks rotates the wheel to lift said shanks, and consequently the reel, into a vertical position and guide it within the track J, as shown in Fig. 2.

A disk, X, affixed to the shaft C, within the guide-track, prevents the rake-arms from falling inward toward the shaft when they are raised to a vertical position.

$y$ is a spring-pawl, fixed to the pivoting-point of one of the shanks E, as clearly shown in Fig. 2. This spring-pawl, as its shank passes the cam, also sweeps with its free end under the cam, and when the toe $f$ has cleared the cam the pawl still bears against it and holds it up to form a passage between its upper surface and the flange $p$ of the curved plate O. The cam is not released until the toe of the succeeding reel-shank enters the passage above it to bear against the flange $p$. This movement throws down the rake-arm and permits the rake to form and deliver a gavel from the platform of the machine before being raised by the lifting-wheel.

By this arrangement a rake is produced automatically at every revolution of the shaft C.

By operating the shipper to throw the cam into a horizontal position, two or more of the arms shall operate as rakes at every revolution of the shaft C. This is sometimes found necessary in very heavy grain. By moving the shipper in the opposite direction the cam is held in an inclined position, and all the arms will then operate as reels. By these means, therefore, alternate reels and rakes are formed, as well as a succession of rakes and a continuous reel.

I am aware that wheels have heretofore been used for raising the rake and reel arms above the platform; but such wheels were constructed without serrations or teeth, and segmental plates were attached to the arms to afford guides for the latter in lifting. By constructing the wheel with serrations, as I propose, the segmental plates are dispensed with, and the arms drop readily into the serrations, by which they are lifted as the wheel revolves.

Having thus described my invention, what I claim as new, and desire to secure by Letters Patent, is—

1. A vertically-revolving serrated or toothed wheel, in combination with the rake and reel arms, substantially as described, for the purpose specified.

2. The combination of the arms E, serrated or toothed wheel L, and circular guide-track, substantially as described, for the purpose specified.

3. The combination, with the rake and reel arms E, of the revolving guide-disk X, elevating-wheel L, and guide-tracks J, substantially as described, for the purpose specified.

4. The reel-arms E, constructed with the toes $f$ and laterally-projecting pins $g$, for the purpose specified.

5. The arrangement of the arms E, spring-pawl $y$, the weighted and pivoted cam R, guide $p$, and support O with relation to each other, for the purpose specified.

6. The arrangement of the shipper S and its foot-lever and connecting-rod with the weighted and pivoted cam R, support O, and the toes of the arms E, for the purpose specified.

J. B. WHITING.

Witnesses:
G. H. FROST,
E. A. ELLSWORTH.